(12) United States Patent
Shiina et al.

(10) Patent No.: US 6,336,811 B2
(45) Date of Patent: Jan. 8, 2002

(54) VR MOTION BASE CONTROL APPARATUS AND IT'S SUPPORTING STRUCTURE

(75) Inventors: Tsukasa Shiina, Chiba; Minoru Katoh, Yachimata; Masayuki Oshiro, Inzai; Takayuki Kamiya, Chiba; Hiroshi Sakairi, Tsukuba; Masami Otomo, Funabashi; Kenji Seino, Chiba, all of (JP)

(73) Assignees: Hitachi, Ltd., Tokyo; Hitachi Keiyo Engineering Co., Ltd., Chiba-Ken, both of (JP)

( * ) Notice: Subject to any disclaimer, the term of this patent is extended or adjusted under 35 U.S.C. 154(b) by 0 days.

(21) Appl. No.: 09/769,342

(22) Filed: Jan. 26, 2001

Related U.S. Application Data

(62) Division of application No. 09/276,739, filed on Mar. 26, 1999.

(30) Foreign Application Priority Data

| Mar. 30, 1998 | (JP) | 10-083092 |
| Apr. 15, 1998 | (JP) | 10-104315 |
| May 28, 1998 | (JP) | 10-147261 |

(51) Int. Cl.$^7$ .................. A63J 23/00; A63G 31/04; A63G 31/16
(52) U.S. Cl. ................ 434/55; 472/60; 472/130
(58) Field of Search .............. 434/35, 46, 427, 434/29, 30, 34, 69; 472/60, 130; 463/36, 6

(56) References Cited

U.S. PATENT DOCUMENTS

| 4,066,256 A | * | 1/1978 | Trumball | 472/60 |
| 4,752,065 A | * | 6/1988 | Trumball et al. | 472/60 |
| 4,798,376 A | * | 1/1989 | Trumball et al. | 472/60 |
| 4,817,950 A | * | 4/1989 | Goo | 463/36 |
| 5,364,270 A | * | 11/1994 | Aoyama | 434/55 |
| 5,486,141 A | * | 1/1996 | Ohga et al. | 472/60 |
| 5,669,821 A | * | 9/1997 | Prather et al. | 472/59 |
| 5,719,763 A | * | 2/1998 | Leyden | 364/167.01 |
| 5,919,045 A | * | 7/1999 | Tagge et al. | 434/62 |
| 6,007,338 A | * | 12/1999 | Dinunzio et al. | 434/55 |
| 6,113,500 A | * | 9/2000 | Francis et al. | 472/60 |
| 6,208,349 B1 | * | 3/2001 | Davidson et al. | 345/427 |

FOREIGN PATENT DOCUMENTS

| JP | 60-143379 | 7/1985 |

\* cited by examiner

Primary Examiner—Joe H. Cheng
Assistant Examiner—Kathleen M. Christman
(74) Attorney, Agent, or Firm—Mattingly, Stanger & Malur, P.C.

(57) ABSTRACT

A VR motion producing apparatus includes a reception unit for receiving a presently projected picture frame No. from a picture apparatus; a detection unit for detecting a frame No. of operation data of a motion base presently executed by a motion base; a difference unit for comparing the picture frame No. with the motion frame No. to calculate a difference between them; a calculation unit for calculating an operation velocity of a motion base so as to correct this difference value; and a synchronization unit for reducing the difference between the picture frame No. and the motion frame No. for operating the motion base from the calculated velocity. A simulation rider transporting apparatus is featured by that an object to be controlled is a dynamic object; a motion model conversion unit is an apparatus for converting a motion model of a dynamic object to be controlled into a motion model of a motion base having a finite stroke, and furthermore contains two crank arms whose one ends are coupled to an elevation unit, a motor equal to a drive unit for changing an angle "∞" between the two crank arms into a preselected value to hold this changed angle, and a speed reducing machine. A crank rod is coupled to a rider containing base while having a rotation free degree along 3 axial directions.

1 Claim, 18 Drawing Sheets

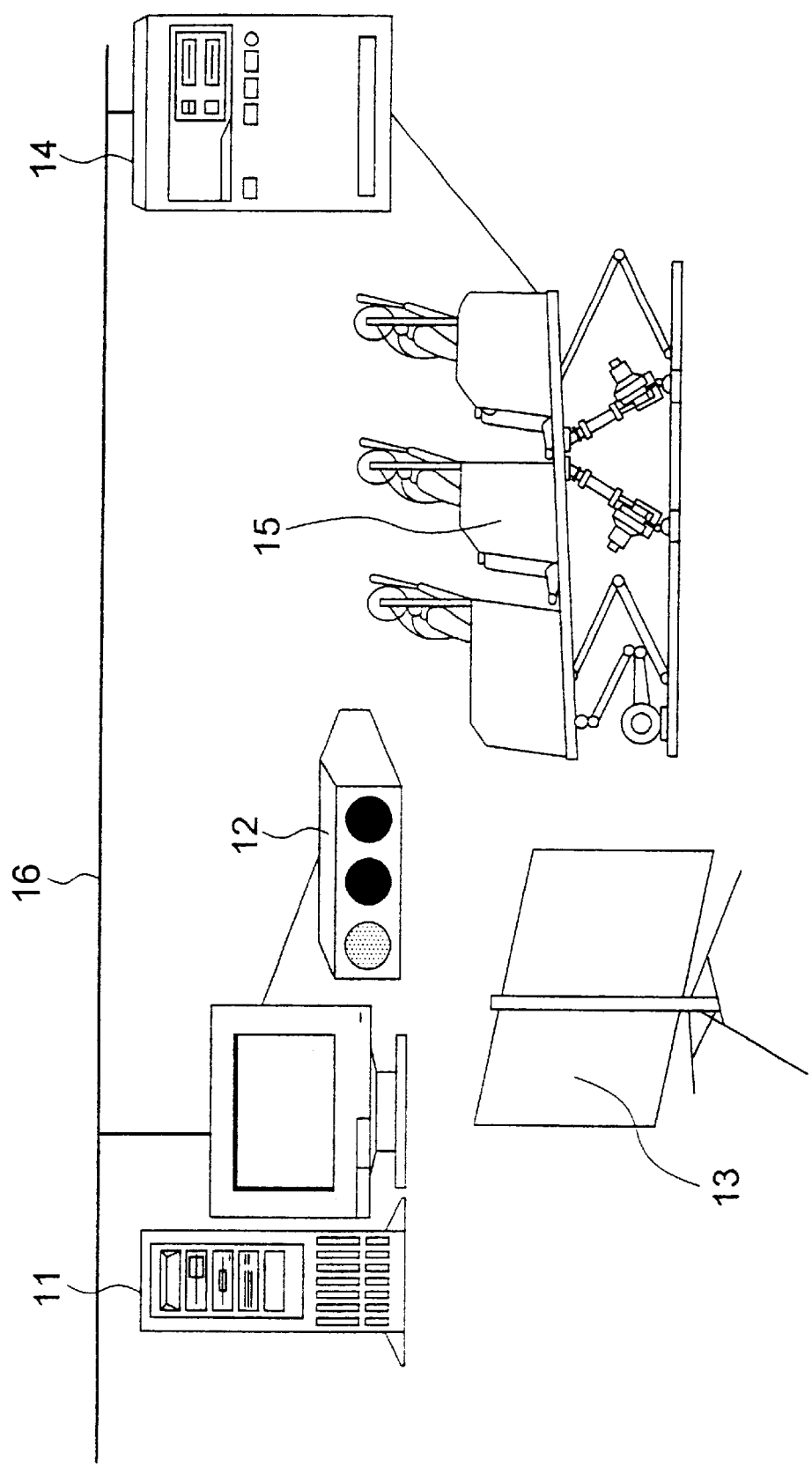

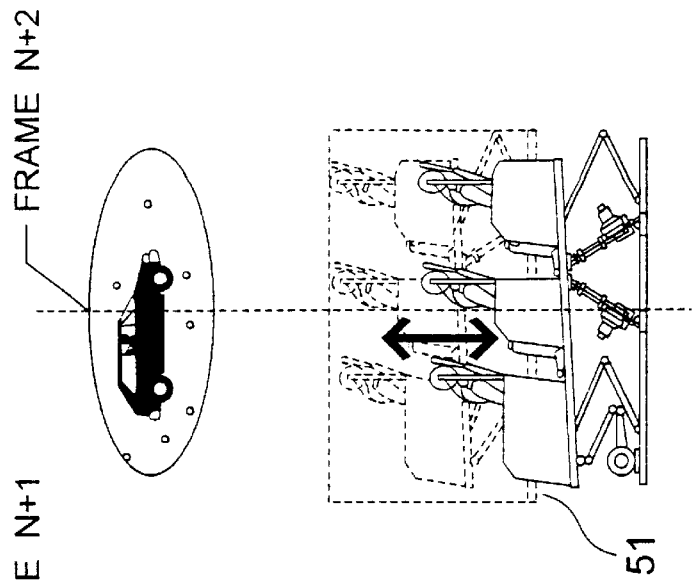
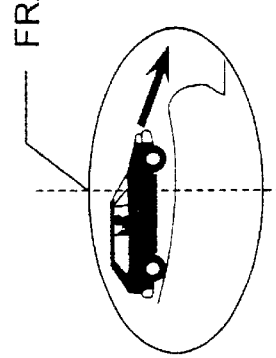
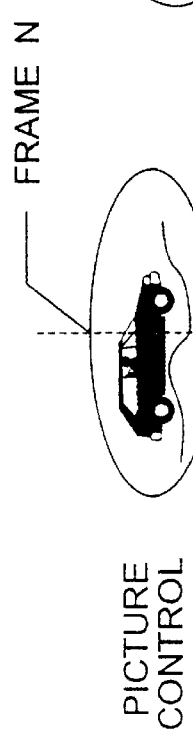
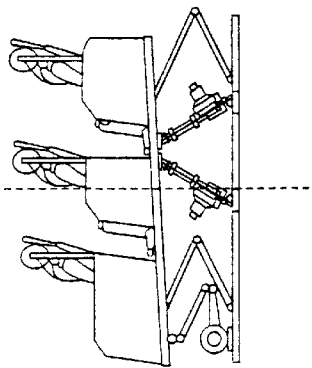

VR MOTION BASE CONTROL APPARATUS AND IT'S SUPPORTING STRUCTURE

This is a divisional application of U.S. Ser. No. 09/276,739, filed Mar. 26, 1999.

BACKGROUND OF THE INVENTION

The present invention is related to a control by a synchronization system between a picture and a motion base in a simulation ride system for moving the motion base in connection with the picture.

Also, the present invention is related to a VR (virtual reality) motion producing apparatus, and more specifically, a motion data producing system of a motion base in a simulation ride system for moving a motion base in connection with a CG (computer graphics) picture.

Furthermore, the present invention is related to a simulation rider transporting apparatus, and more specifically, to a simulation rider transporting apparatus containing a means for constraining an attitude and a position of a rider, e.g., a seat and an arm; a carriage for mounting this constraining means; a means for constraining that this carriage is transportable; and an actuator.

Conventionally, since a picture scenario is determined (non-interactive system), a synchronization between a picture and an operation of a motion base is merely established only at a starting time. Thereafter, a picture apparatus and a motion base control apparatus are independently controlled.

Also, conventionally, in a simulation ride system for operating a motion base in connection with a CG picture, for example, in a flight simulator, in order to form motion (movement) of the motion base, namely motion data, a person who is observing this CG picture directly operates this motion to instruct the movement (for example, a direct instruction while actually moving a motion base, this operation is instructed; an off-line instruction such that while moving a model of a motion base, this operation is instructed; and an NC instruction such that while actually entering as numeral values velocities and positional changes in the respective axes of a motion base, this operation is instructed).

These conventional instruction methods are directed to such instruction methods for mainly using the motion bases, which are substantially determined by human sensitivities. Therefore, expert techniques are necessarily required, and these conventional instruction methods should required huge amounts of cost and very large numbers of manufacturing stages. On the other hand, while CG (computer graphics) techniques are progressed, pictures are also expressed by computer graphics. As a consequence, the scenario fixed systems are substituted by such systems that scenarios are changed by events. In this scenario fixed system, operation patterns of dynamic objects to be controlled (air plane and vehicle etc.,) are previously defined, namely, the non-interactive system. In the latter system, namely the interactive system, the operation patterns of the dynamic objects to be controlled are changed in response to handle operations. That is, the operation patterns can be hardly predicted. In this latter-mentioned interactive system, since the operation patterns can be hardly predicted, there is such a problem. That is to say, in the conventional system such that the operation patterns have been defined as the initial condition, the operations of the motion base cannot be instructed.

Furthermore, the conventional simulation rider transporting apparatus is comprised of: means for constraining an attitude of a rider and a position thereof such as a seat and an arm; a first base for riding thereon both the rider and said containing means; a second base arranged under said first base; and elevation means for elevating said first base; a base; and a forward/backward transportable actuator. Then, as this elevation means, such an elevation device is known (see JP-A-60-143379). This elevation device is located under the first base, the respective actuators are coupled to the first base at the maximum points thereof, and the first base is moved in the swing manner by expanding/compressing the cylinder type rod.

In this conventional simulation rider transporting apparatus, since the base is moved in the swing manner by expanding/compressing the cylinder type rod, both the lengths of the actuators and the length of the rod become long. Therefore, there is such a problem that the height of the simulation rider transporting apparatus is increased. Thus, such a high simulation rider transporting apparatus can be hardly installed in the existing facilities.

Also, another conventional simulation rider transporting apparatus is known. That is as the elevation means, cranks are used, and, a drive means is used so as to hold the angle between each of the cranks and the second base as a preselected value and the change this value. However, since torque of the drive means is effected between the second base and the cranks, undesirable situations occur.

Moreover, as a means for constraining the first base and the attitude, the constraining mechanism is required in addition to the actuator. Thus, the apparatus becomes complex, which may cause an increase of the weight thereof.

Also, there are since cases that although the picture is synchronized with the operation of the motion base at the starting time in the prior art, this synchronization is shifted due to differences in the processing capabilities of the respective control apparatuses thereof.

If the picture is not synchronized with the operation of the motion base, then the motion data (operation) which is originally produced in connection with the picture would be executed when the originally set picture scene is displayed.

This situation may give unpleasant feelings to the persons who ride on the motion base. As a result, the concentration feelings to the picture play world directed by the simulation ride system would be lost.

A subject to be solved by the present invention is to provide a correction means effected in such a case that a synchronization between a picture and operation of a motion base is shifted.

The present invention is equipped with the below-mentioned means as a means for solving the above-explained subject without deteriorating concentration feelings of a rider on a motion base with respect to a picture.

(1) A correction means fitted to a picture is provided on the basis of a picture.

(2) A means for using/correcting a frame* No. (number) of a picture sync command every frame during which a picture can be outputted is provided.

A means for comparing a frame No. present in a picture sync command (frame presently displayed by picture apparatus) with a frame No. indicative of motion data executed by a motion base, for calculating a correction velocity from a difference component to change an operation velocity of the motion base, and thereby for synchronizing the motion data with the picture.

A correcting method effected when the frame No. is used is such a means that the motion data is changed into motion data of the relevant frame No. based upon the frame No. of the picture which is outputted from the picture apparatus and is presently imaged, and subsequently, the motion data arranged in a sequential manner are executed so as to synchronize the picture with the operation of the motion base.

Even when the synchronization established between the picture and the operation of the motion base is shifted, the motion base control apparatus having the means for solving the above-described problem can maintain the synchronization between the picture and the operation of the motion base without correcting the picture (when the picture is corrected, the frame will drop).

Also, another object of the present invention is to provide a VR motion producing apparatus capable of producing motion base operation data from CG data, capable of producing operation data of a motion base even in an interactive system that an operation pattern cannot be previously predicted, and also capable of being widely applied to various motion bases.

The present invention is to provide a VR motion producing apparatus comprising motion model converting means for converting a motion model of an object to be controlled which is moved within a virtual reality space constituted by computer graphics into another motion model of a motion base having a finite stroke, wherein: the object to be controlled is a dynamic object; and the motion model converting means converts the motion model of the dynamic object to be controlled into the motion model of the motion base having the finite stroke.

The present invention is to provide a VR motion producing apparatus wherein: the motion model converting means converts coordinate data of the motion model of the dynamic object to be controlled into coordinate data of the motion model of the motion base.

The present invention is to provide a VR motion producing apparatus wherein: the motion model converting means is conversion means for converting in a real time.

The present invention is to provide a VR motion producing apparatus wherein: the VR motion producing apparatus is used in a simulation ride system corresponding to an interactive system.

The present invention is to provide a VR motion producing apparatus wherein: the VR motion producing apparatus is comprised of: means for extracting coordinate data used to draw the motion model of the dynamic object to be controlled; means for calculating a velocity change of the dynamic object to be controlled within the VR space from the extracted coordinate data; and means for calculating an attitude change of the dynamic object to be controlled every time instant.

The present invention is to provide a VR motion producing apparatus wherein: the VR motion producing apparatus is comprised of: means for resolving the calculated velocity change into the respective axial components of an object coordinate system fixed to a dynamic model to be controlled so as to calculate a velocity change amount of each of the axes of the object coordinate system; and means for scaling the calculated velocity change amount to convert the scaled velocity change amount into a motion amount within a finite stroke of a motion base which is actually operated.

Furthermore, the present invention is to provide a VR motion producing apparatus wherein: the VR motion producing apparatus is comprised of: means for converting the calculated attitude change of the dynamic object to be controlled into a rotation amount of each of the axes of the object coordinate system fixed to the dynamic object to be controlled; and means for scaling the converted rotation amount to convert the scaled rotation amount into a motion amount within a finite stoke of a motion base which is actually operated.

The present invention is to provide a VR motion producing apparatus wherein: the VR motion producing apparatus is comprised of: means for cutting a frequency component of data at a designated frequency with respect to operation data of the motion base calculated by the operation model connecting means; and means capable of producing motion data of a motion base, taking account of a mechanical mechanism of a motion base.

Furthermore, the present invention is to provide a simulation rider transporting apparatus capable of suppressing a height of this simulation rider transporting apparatus to a low height.

The present invention is to provide a simulation rider transporting apparatus comprising: means for constraining an attitude of a rider and a position thereof such as a seat and an arm; a first base for riding thereon both the rider and the containing means; a second base arranged under the first base; and elevation means for elevating said first base, wherein: the elevation means owns two cranks which are arranged opposite to each other between the first base and the second base; the two cranks own crank arms whose one edge is coupled to the second base, and a crank rod for coupling the other edge of the crank arm to the first base; and the simulation rider transporting apparatus is comprised of drive means for changing a relative angle between the two crank arms into a predetermined value, and for holding the changed relative angle.

The present invention is to provide a simulation rider transporting apparatus wherein: coupling means having a rotation free degree along three axial directions is arranged between the crank rod and the first base, and the drive means is a single motor.

The simulation rider transporting apparatus is further comprised of: means for driving the second base along forward/backward direction.

Concretely speaking, the elevation means owns a rotation free degree with respect to one axial direction which intersects at a right angle a plane where the cranks are moved; and three sets of the elevation means are arranged on front center portion and both side of rear portions concerned with the second base, and the three elevation means are disposed so that moving surfaces of each crank intersects at one point.

BRIEF DESCRIPTION OF THE DRAWINGS

FIG. 1 is a system structural diagram according to an embodiment of the present invention.

FIG. 5A, FIG. 5B and FIG. 5C are explanatory diagrams for indicating a deviation of a picture from a motion control.

DETAILED DESCRIPTION OF THE EMBODIMENTS

Figure 2A:
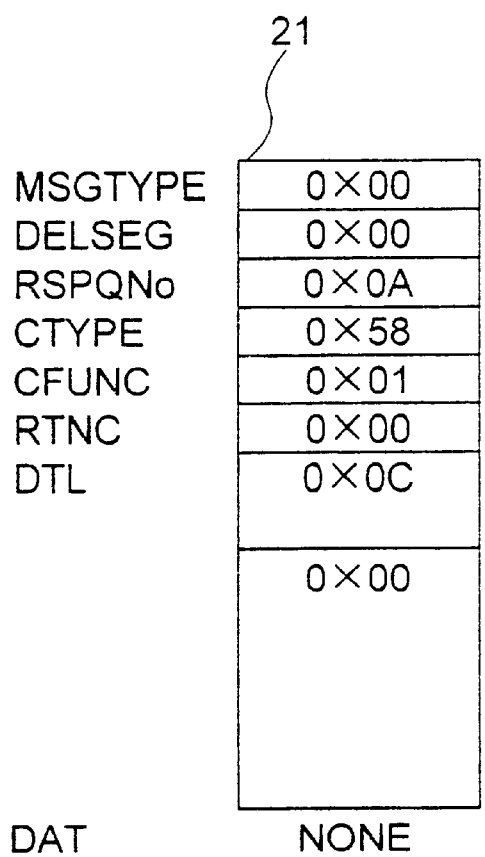
FIG. 2A and FIG. 2B are I/F command specification diagrams between a picture and a motion control apparatus in the embodiment of FIG. 1.

Referring now to FIG. 1, an embodiment of the present invention will be explained. FIG. 1 indicates a system arrangement for carrying out the present invention.

A picture apparatus uses a projector 12 from a picture control apparatus 11 to display a picture on a screen 13.

A motion base 15 is controlled by a motion base control apparatus 14. The motion base control apparatus 14 is connected to the picture control apparatus 11 by a LAN 16, so that data can be transmitted/received between them.

Figure 2B:
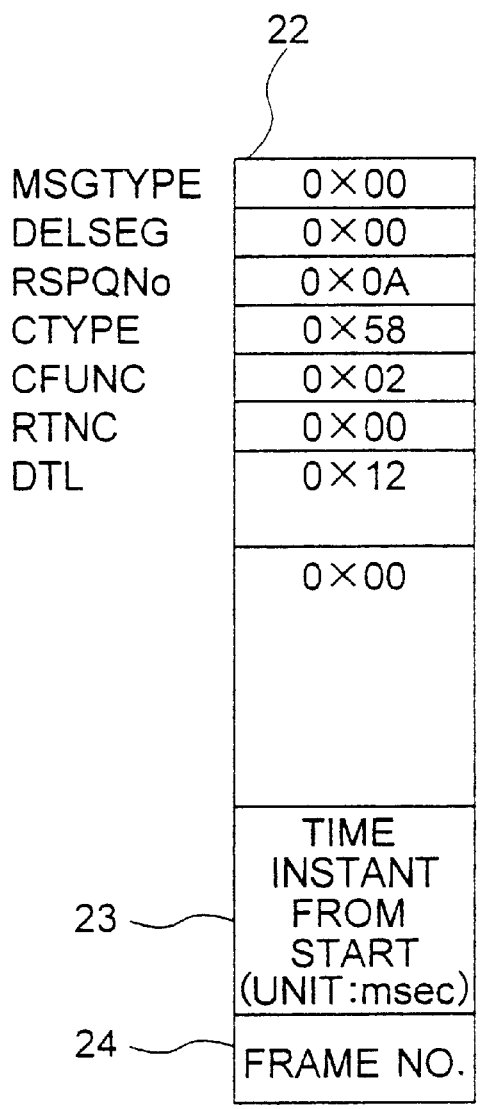

When in response to a starting instruction, the picture apparatus outputs picture data stored inside the picture control apparatus 11 to the projector 12 every 1 frame, both a picture starting command 21 and a picture sync command 22 shown in FIG. 2A and FIG. 2B are transmitted from the picture control apparatus 11 to the LAN 16, and are received by the motion control apparatus 14.

Figure 3:
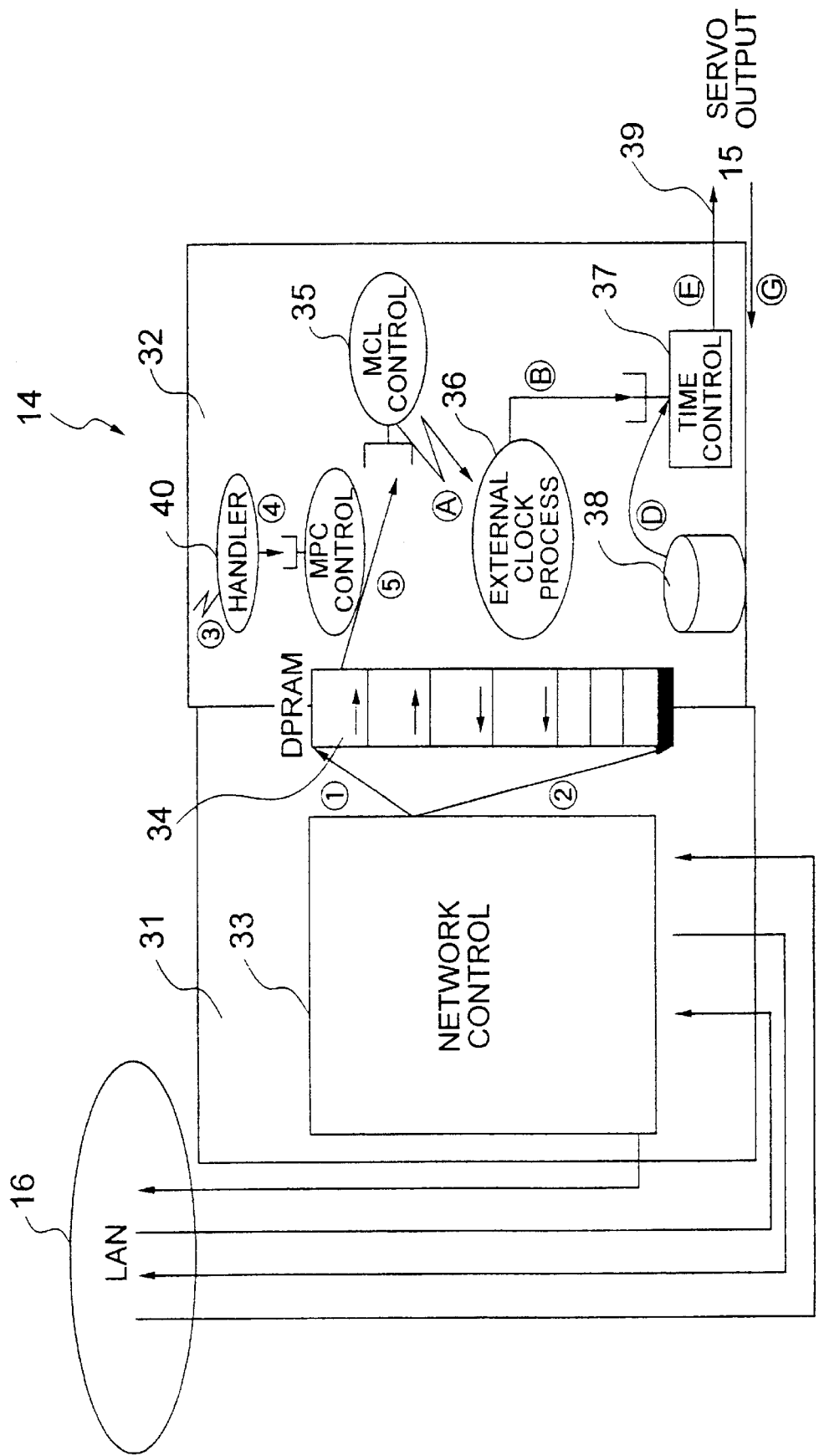
FIG. 3 is a diagram for showing an arrangement of the motion control apparatus and a data flow thereof.

In FIG. 2A and FIG. 2B, the respective abbreviated words are given as follows:

MSGTYPE: message sort
DELSEG: reception segment (message buffer) deleting attribute
RSPQNO: message responding queue No.
CTYPE: message type
CFUNC: message function sort code
RTNC: return code
DTL: data length
DAT: data The motion control apparatus 14 is so arranged that this motion control apparatus 14 is separated into a man/machine controller processor (MCP) 31 functioning as an I/F with respect to the LAN shown in FIG. 3, and also a realtime control processor (RCP) 32 for controlling a motion control in a realtime manner, and these processing systems are coupled with each other by way of a DPRAM 34 equipped with an interrupt function.

First, when the picture starting command 21 transmitted from the picture control apparatus 11 of FIG. 1 to the LAN 16 is received by a LAN control system 33 of the MCP 31, the LAN control system 33 writes a command into an area of the DPRAM 34 so as to transfer the picture starting command to the RCP 32, and issues an interrupt in order that the RCP 32 can recognize this picture starting command (process (1)).

When the interrupt is established in the RCP 32 at a process (2), a handler 40 of the RCP 32 is operated (process (3)), and data is passed via the man/machine controller processor (process (4)) to an MCL control 35 for controlling the motion (process (5)).

In the MCL control 35, a check is made as to whether or not the motion base is set under initiation available state. If the motion base is set under initiation available state, an external clock process 36 is initiated (process A) by which a trigger is applied so as to regularly initiate a time control 37 (servo control).

The external clock process 36 initiates the time control 37 every time a time period of 1 frame (namely, time interval used to display 1 frame by picture apparatus 1) (process B). The time control acquires data from a motion data file 38, which are arranged in the order of the frame number (process D). While using this data as an instruction value, the servo control is carried out (process E), so that operation of a motion base is realized.

Figure 4:
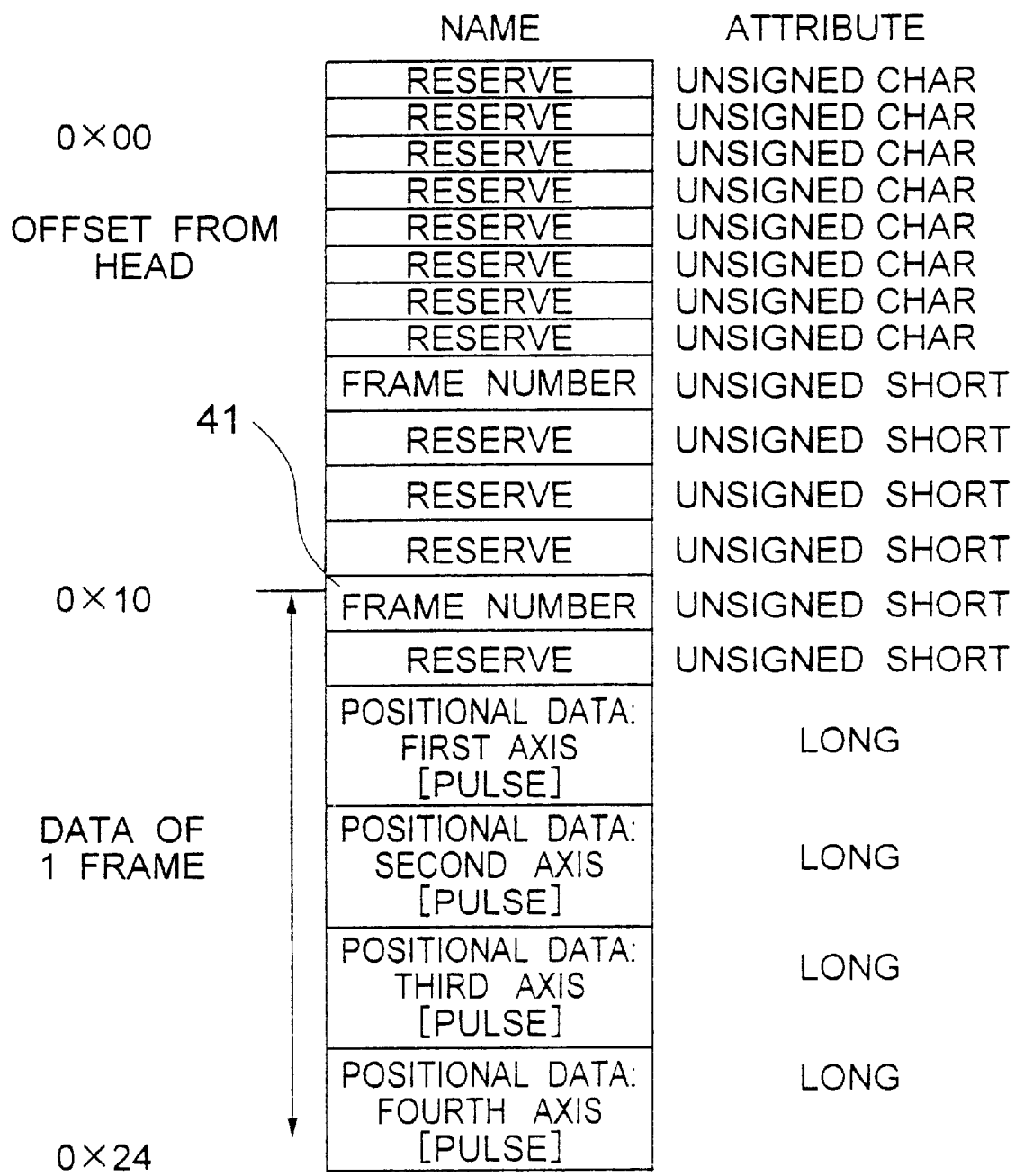
FIG. 4 is a diagram for representing a format of motion data.

During operation, motion data having a format of FIG. 4 for each of frames is derived every an external clock time period, an instruction value is outputted to a servo (process E), and a feedback G is monitored to operate so as to realize a control in connection with a picture. In this case, symbol "Unsigned Char" is 1-byte data without code, symbol "Unsigned Short" shows 2-byte data without code, and symbol "Long" represents double precision floating decimal point data.

However, this process operation would cause a difference with respect to the motion control apparatus for originally controlling the frame display period as a constant frame display period, since this frame display period of the picture apparatus.

When this condition is explained with reference to FIG. 5A, FIG. 5B, FIG. 5C, under picture control, a picture originally drops in a frame N+1 (FIG. 5B). In synchronism with this picture drop, the motion base must carry out operation of the drop condition 51. However, when the synchronization is shifted, or deviated (in FIG. 5B, motion base is delayed), operation of the horizontal operation 52 is carried out.

When this delay happens to occur, the picture cannot be synchronized with the operation of the motion base, so that this condition would give unpleasant feelings to a person riding on the motion base, and also would deprive concentration feelings to the picture.

As a consequence, in accordance with the present invention, such a system can be realized that the operation of the motion base is corrected, and even when the frames of the picture apparatus are fluctuated, the operation of the motion base can be synchronized with the picture by the correction.

First, a frame No. present in a picture sync command (namely, frame presently displayed by picture apparatus) is compared with another frame No. indicative of motion data executed by the motion base, a correction velocity is calculated from a difference between them, and the operation velocity of the motion base is changed, so that the motion data can be synchronized with the picture.

Figure 6:
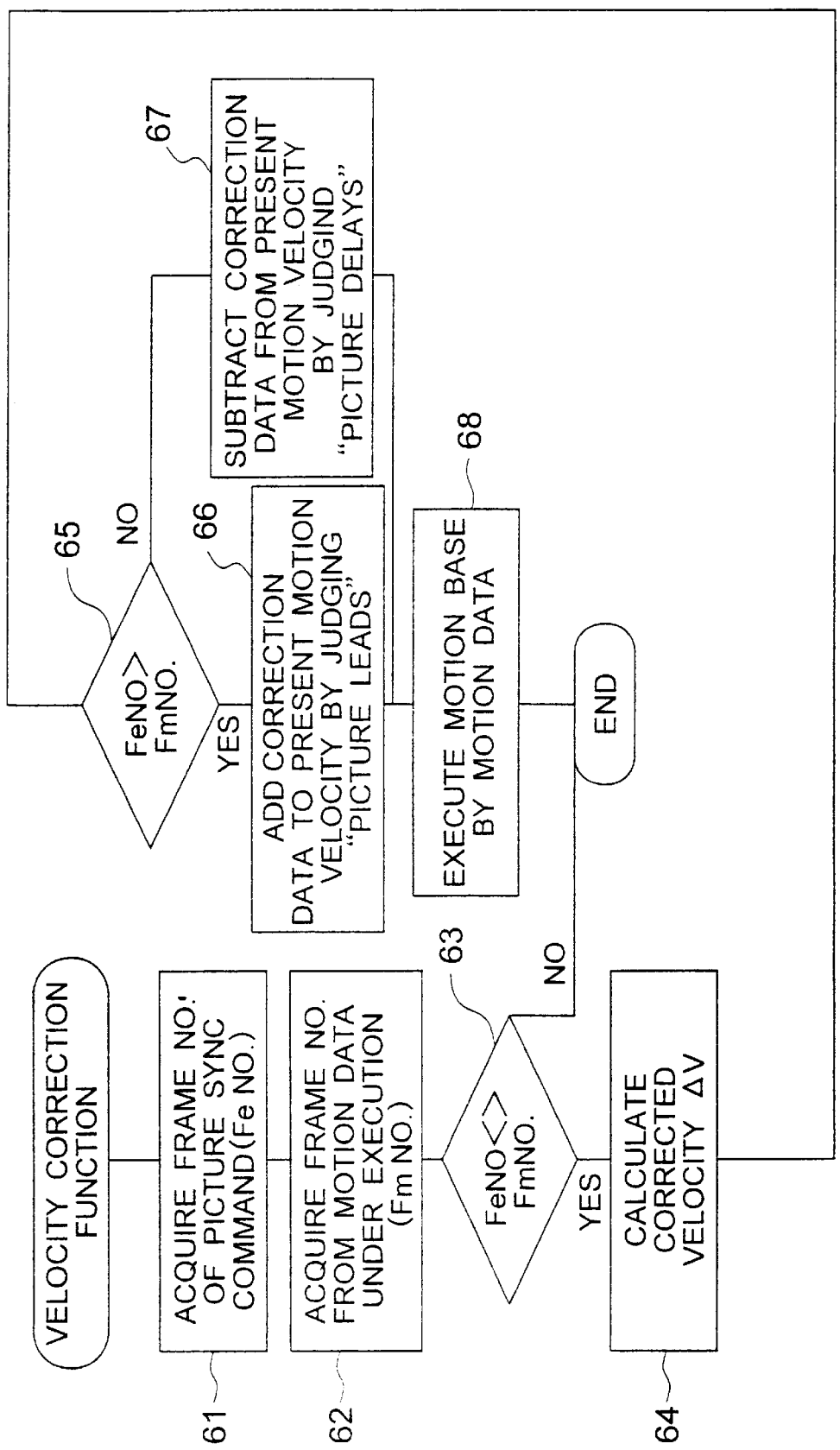
FIG. 6 is a flow chart of a speed correction function.

FIG. 6 indicates a flow chart of this process operation.

The motion control apparatus 14 transfers the picture sync command up to the MCL control 35 shown in FIG. 3 similar to the picture starting command. In the MCL control 35, a frame No. (Fe No., numeral 24 of FIG. 2) is derived from the picture sync command (step 61). At the same time, another frame No. (Fm No., numeral 41 of FIG. 4) is derived from the motion data under execution by the time control 37 (step 62). While comparing these two frames with each other (step 63), when the comparison result is the same, it can be judged that the synchronization is established, and then no correction control is carried out. When the comparison result at the step 63 becomes different, a correction velocity "DV" is calculated in accordance with formula (1) (step 64).

A calculation method of the correction velocity "Δ":

$$\Delta V = Vn - (\Delta L/(T+\Delta T)) \qquad (1)$$

Vn: move velocity up to target position
T: reach time up to target position
ΔL: move distance from present position up to target position
ΔT: sync shift time calculated from difference in frame numbers
ΔT=(FeNo.−FmNo.)*S
FeNo. : frame No. of picture sync command
FmNo. : execution frame No. of motion control apparatus
S: 1 frame time period Then, a large/small relationship between the frame Nos is compared (step 65). When the frame No of the picture sync command is large, it is so judged that the picture is advanced. In order to increase the operation velocity of the motion base, the correction velocity calculated based on the formula(1) is added to the original operation velocity (step 66).

When the reverse relationship is established, it is so judged that the picture is delayed (step 65). In order to delay the operation velocity, the calculated correction velocity is subtracted (step 67). As a result of this process operation, the velocity can be corrected.

Figure 7:
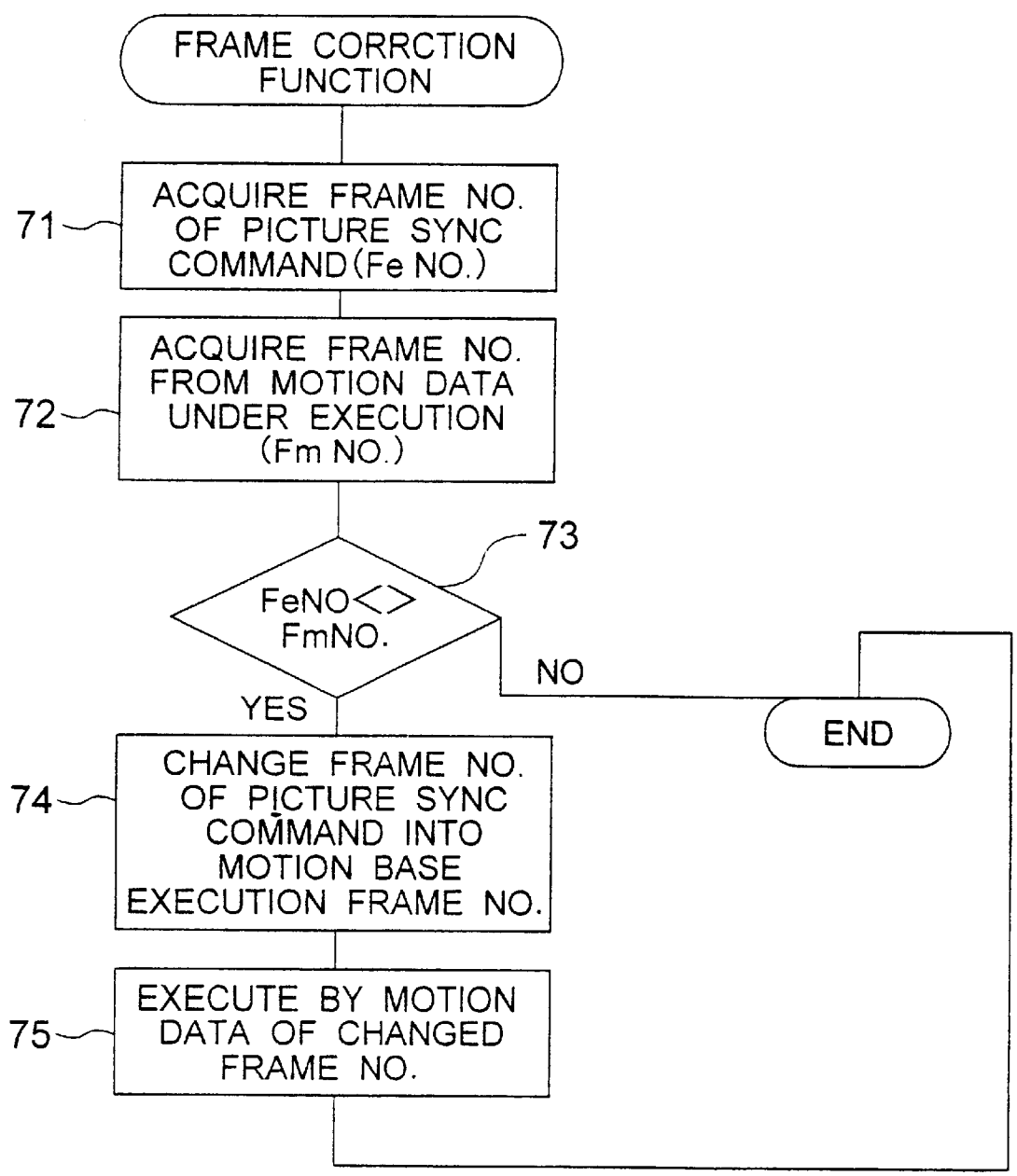
FIG. 7 is a flow chart of a frame correction mechanism.
Figure 8:
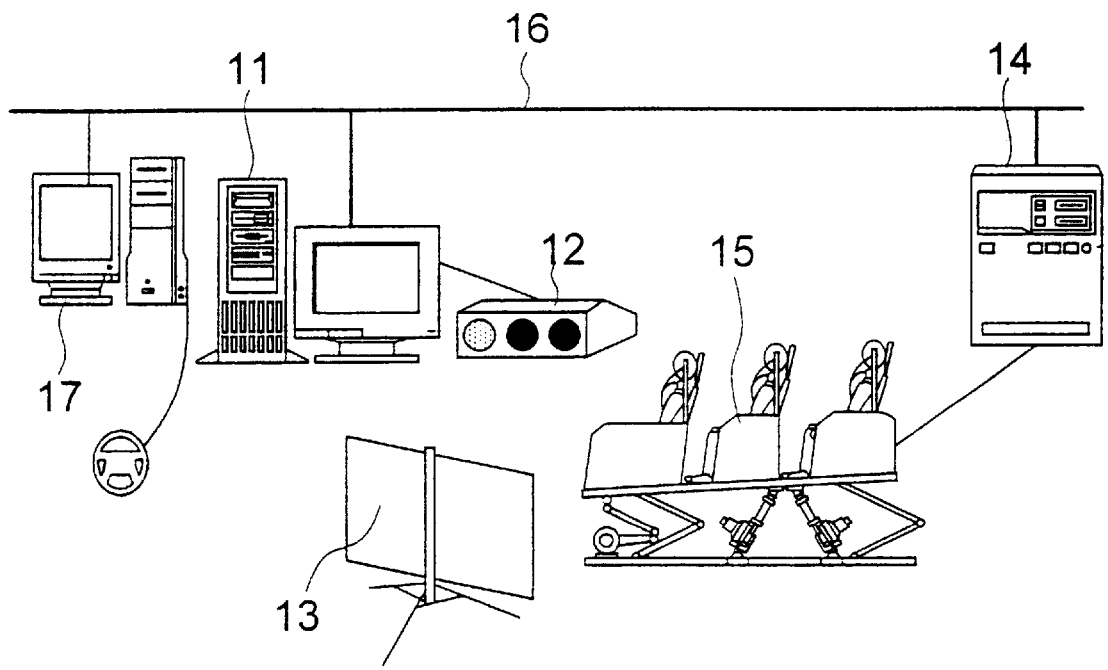
FIG. 8 is a diagram for showing one structural example of a simulation ride system employed in a VR motion producing apparatus according to another embodiment of the present invention.
Figure 9:
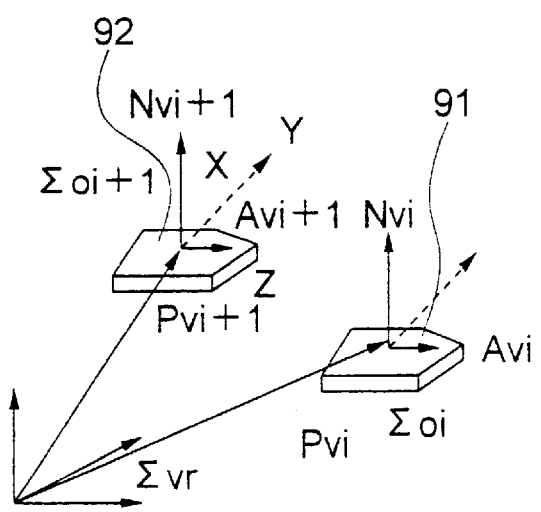
FIG. 9 is a diagram for showing an example of picture output coordinate data in the structural example of FIG. 8.
Figure 10:
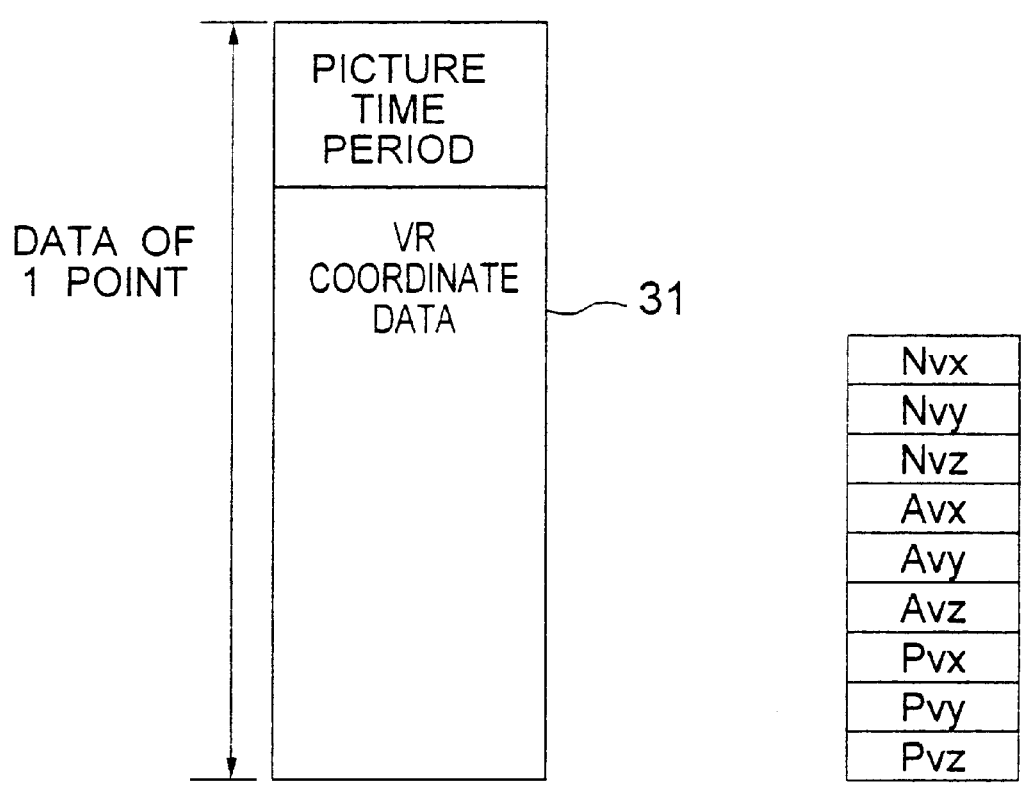
FIG. 10A and FIG. 10B are explanatory diagrams for explaining an example of an output format of a picture system in the structural example of FIG. 8.
Figure 11:
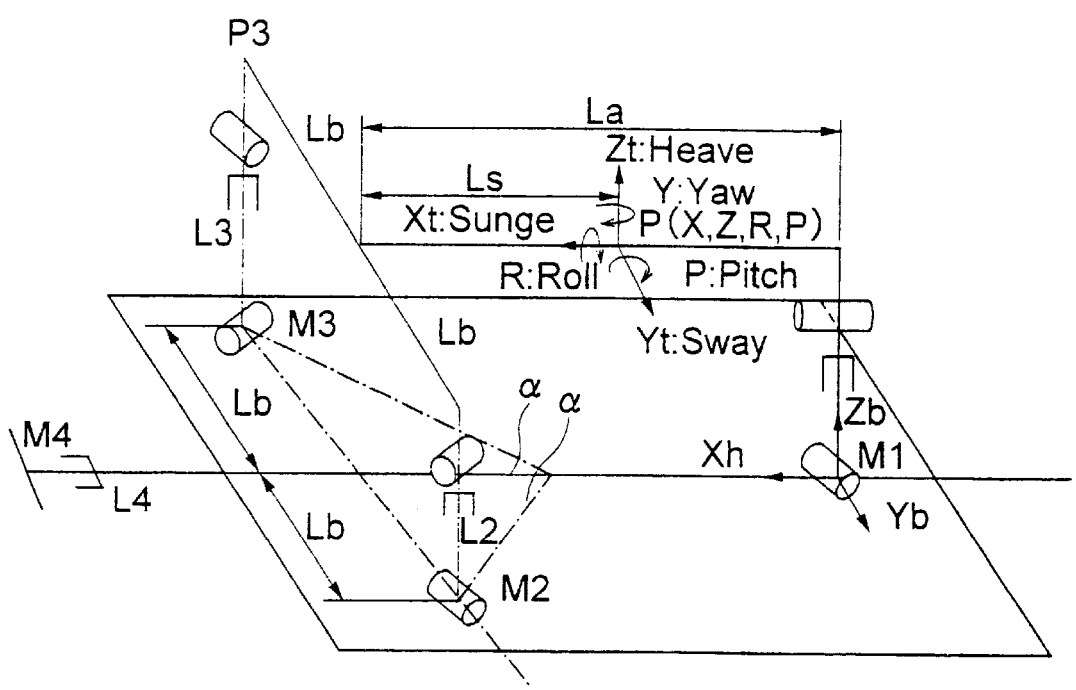
FIG. 11 is a diagram for showing an example of a motion executing mechanism on a motion base having a finite stroke in the structural example of FIG. 8.
Figure 12:
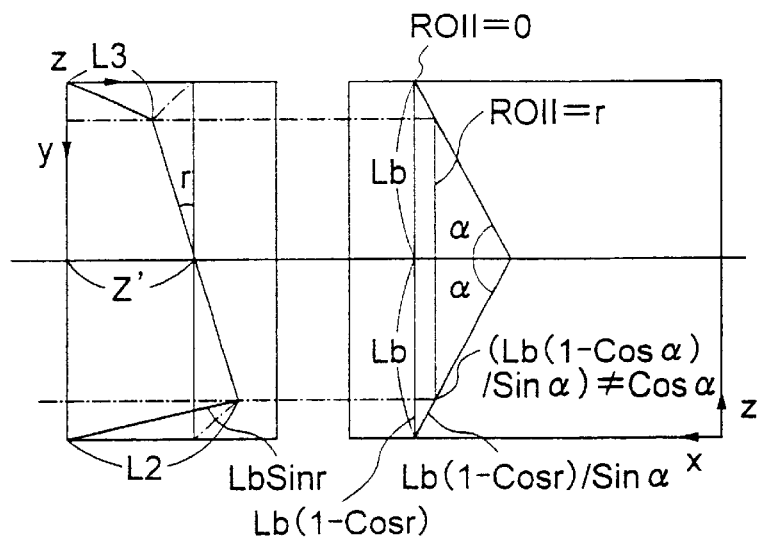
FIG. 12A, FIG. 12B, and FIG. 12C are explanatory diagrams for explaining an example of reverse converting formulae in the motion executing mechanism.
Figure 12:
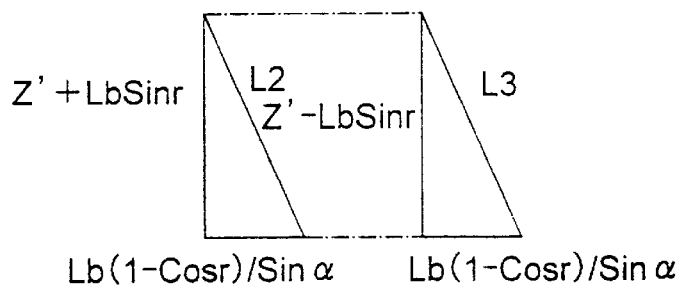
Figure 12:
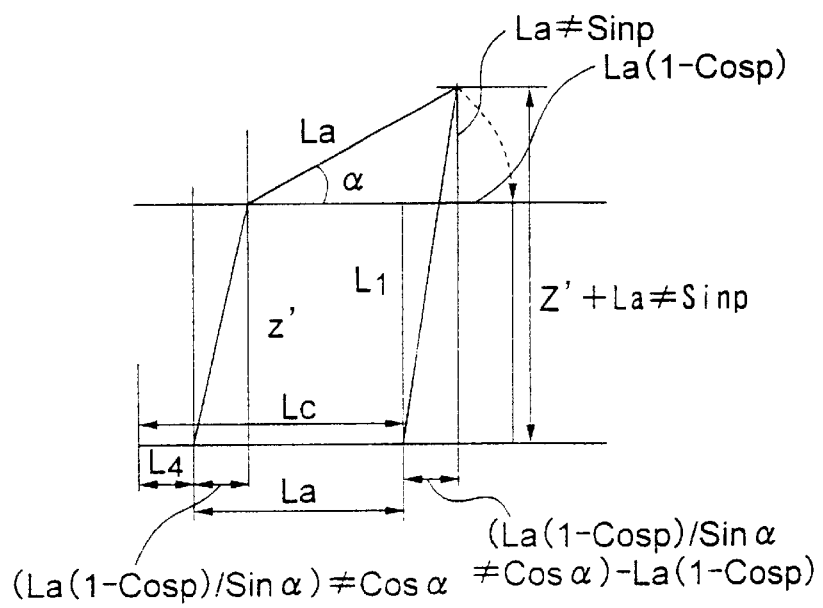
Figure 13:
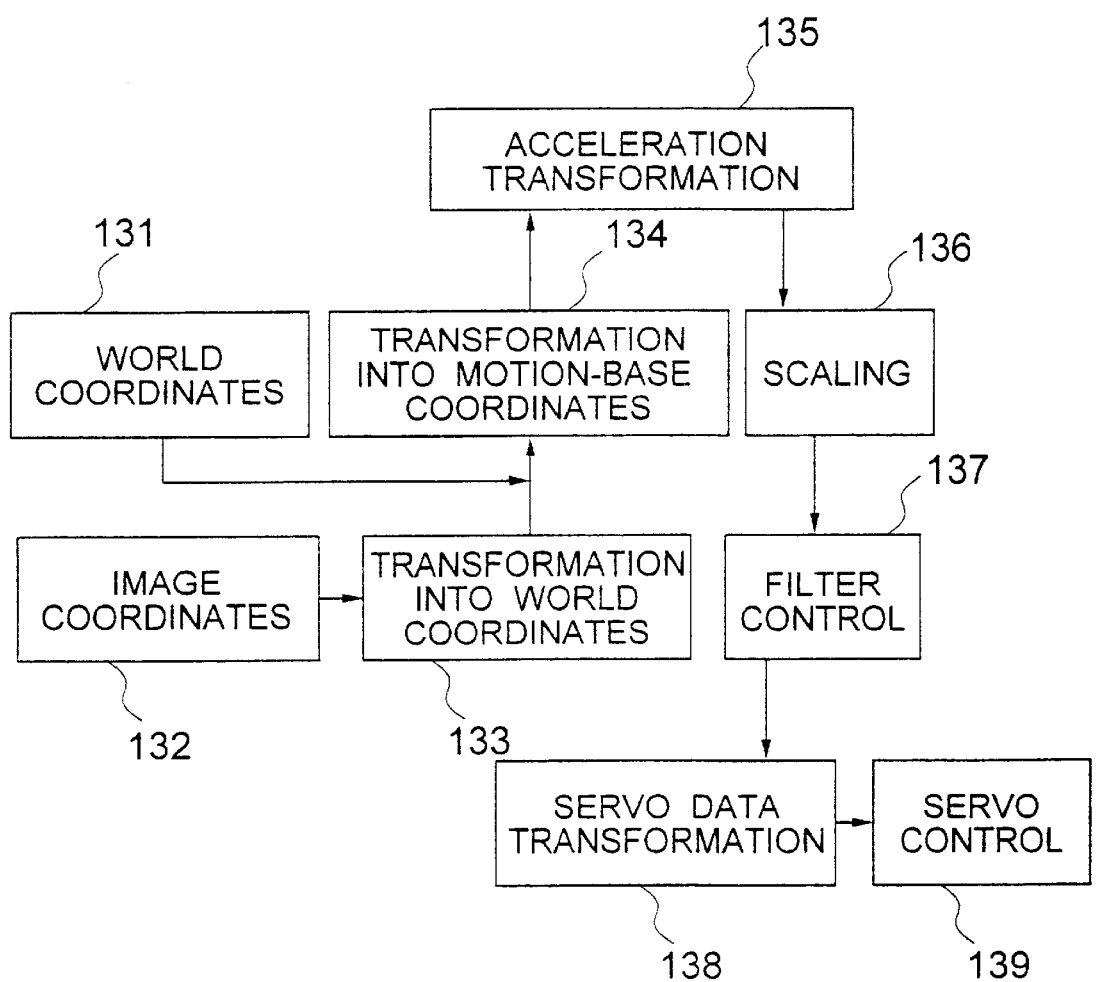
FIG. 13 is an explanatory diagram for explaining an example of a model execution flow.
Figure 14:
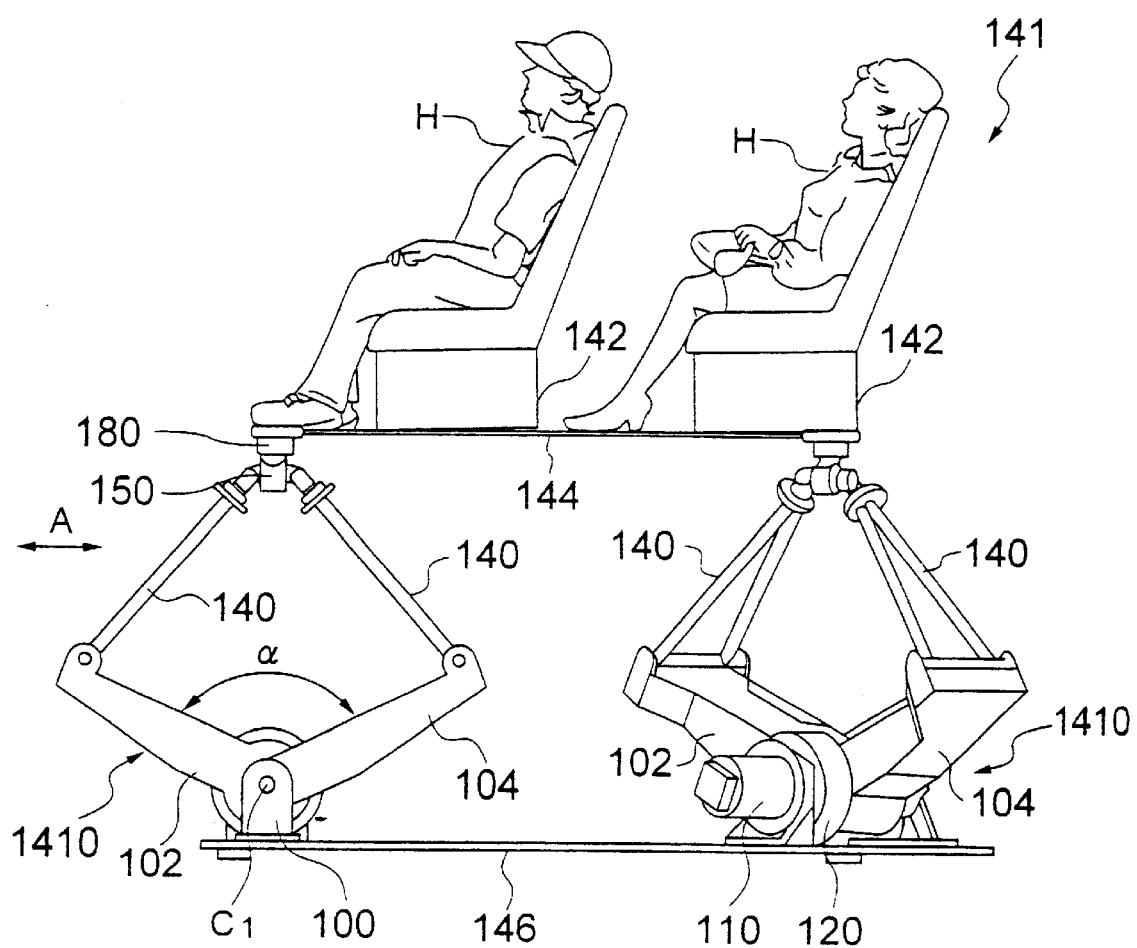
FIG. 14 is a side view for showing a simulation rider transporting apparatus according to a further embodiment of the present invention.

Next, a description will now be made of the frame correction with reference to FIG. 7. FIG. 8 is a diagram for showing one structural example of a simulation ride system employed in a VR motion producing apparatus according to another embodiment of the present invention. FIG. 9 is a diagram for showing an example of picture output coordinate data in the structural example of FIG. 8. FIG. 10A and FIG. 10B are explanatory diagrams for explaining an example of an output format of a picture system in the structural example of FIG. 8. FIG. 11 is a diagram for showing an example of a motion executing mechanism on a motion base having a finite stroke in the structural example of FIG. 8. FIG. 12A, FIG. 12B, and FIG. 12C are explanatory diagrams for explaining an example of reverse converting formulae in the motion executing mechanism. FIG. 13 is an explanatory diagram for explaining an example of a model execution flow.

As represented in FIG. 8, one example of an arrangement of a simulation ride system with employment of the VR motion producing apparatus according to this embodiment, is arranged by a picture control apparatus 11, a projector 12, a screen 13, a motion base control apparatus 14, a motion base 15, and a LAN 16, and also an input apparatus 17 equipped with an handle.

The picture control apparatus 11 stores data picture (picture made by CG) in a system where a scenario is changed by an event (namely, a system such that an operation pattern of a dynamic object to be controlled is changed by manipulating a handle provided on the input apparatus 17, i.e., an interactive system such that an operation pattern can be hardly predicted). The projector 12 receives the data picture from the picture control apparatus 11 and then projects the picture onto the screen 13.

The motion base control apparatus 14 controls the operation and the like of the motion base 15. The motion base 15 causes a person to ride thereon. The LAN 16 connects the motion base control apparatus 14 to the picture control apparatus 11, so that the data can be transmitted/received. The input apparatus 17 is manipulated by the person who rides on the motion base. As a result, the data picture is projected from the picture control apparatus 11 onto the screen 13 by using the projector 12. In the case that the person who rides on the motion base 15 manipulates the input apparatus 17 in accordance with a content projected on the screen 13, the person can own the interactive characteristic.

When the picture control apparatus 11 starts to project the picture, in order to draw a dynamic object to be controlled (namely, when the person who rides the motion base 15 rides on this object, this person becomes a content as an assumption) within a VR space, the picture control apparatus 11 controls attitude/position data on this VR space to draw the object to be controlled on the VR space. An example of coordinate data Σoi at this time is shown in FIG. 9. The picture control apparatus 11 produces in a time sequential manner (time instant "i" 91, time instant i+1, 92), coordinate data (attitude and position) of a VR coordinate system Σvr indicated in FIG. 9. This data is derived in the time sequential manner, this derived data is converted into VR space coordinate data 31, and then the VR space coordinate data is outputted from the picture control apparatus 11 to the LAN 16. As indicated in FIG. 10A, the VR space coordinate data 31 is constituted by a picture time period and VR coordinate data. Then, as represented in FIG. 10B, the VR coordinate data is arranged by attitude data (Nvx, Nvy, Nvz, Avx, Avy, Avz) and positional data (Pvx, Pvy, Pvz). The VR space coordinate data 31 is outputted to the LAN 16, and is received by the motion control apparatus 14.

The motion control apparatus 14 owns the above-explained arrangement of FIG. 3.

First, when the VR space coordinate data is received by a LAN control system 33 of the MCP 31, the LAN control system 33 writes a command into an area of the DPRAM 34 so as to pass to the RCP 32 (1), and issues an interrupt which can be recognized by the RCP 32. When the interrupt is made in the RCP 32, the handler 40 of the RCP 3 is operated (2), the data is transferred to the MCL control 35 for controlling the motion. The MCL control 35 judges as to whether or not the motion base is set under initiatable state. If the motion base is brought into such an initiatable state, then an external clock process 36 is initiated which may apply such a trigger used to regularly initiate the time control 37 (servo control). (A) The external clock process 36 initiates the time control 37 every time period of 1 frame (namely, time interval during which the video control apparatus displays 1 frame), and executes the following control, so that the operation of the motion base in such a manner that motion data of a motion base having a mechanism model shown in FIG. 11 as one example the VR space coordinate data is produced, and this produced motion data is operated as an instruction value.

In the time control 37, both the VR space coordinate data 21 and 22 at a time instant "i" and another time instant "i+1" are acquired. At this time, the data may be defined as follows:

Σvr: VR space coordinate system (word coordinate system),

Σoi: dynamic object (to be controlled) coordinate system (time instant "i"),

Pvi=(Pvxi, Pvyi, Pvzi): origin positional data vector (time instant "i") of object (to be controlled) coordinate system, Avi=(Avxi, Avyi, Avzi): advance direction vector (time instant "i") of object (to be controlled) object coordinate, Nvi=(Nvxi, Nvyi, Nvzi): normal direction vector (time instant "i") of object (to be controlled) object coordinate.

It should be noted that the X axis of Σoi is made coincident with Nvi, and the Z axis of Σoi is made coincident with Avi.

When the above-described origin positional data vector Pvi of the dynamic object (to be controlled) object coordinate system is used, the velocity vector Vi can be calculated based on formula (2):

$$\vec{V}_i = \frac{|\vec{P}_{i+1} - \vec{P}_i|}{(i+1) - i} \quad (2)$$

Also, a simultaneous transformation matrix "Ai" of the object (to be controlled) coordinate system Σoi at the time instant "i" is given by formula (3):

$$A_i = \begin{vmatrix} \vec{N}_{vi} & \vec{N}_{vi} \times \vec{A}_{vi} & \vec{A}_{vi} & \vec{P}_{vi} \\ 0 & 0 & 0 & 1 \end{vmatrix} \quad (3)$$

Then, assuming now that a simultaneous transformation matrix from the object (to be controlled) coordinate system Σoi at the time instant "i" to the coordinate system Σoi+1 at the time instant "i+1", the following formula (4) is established:

$$A_{i+1} = A_i \times B_{i+1} \quad (4)$$

$$\therefore B_{i+1} = A_i^- \times A_{i+1}$$

$$= \begin{vmatrix} N_{vxi+1} & O_{vxi+1} & A_{vxi+1} & P_{vxi+1} \\ N_{vyi+1} & O_{vyi+1} & A_{vyi+1} & P_{vyi+1} \\ N_{vzi+1} & O_{vzi+1} & A_{vzi+1} & P_{vzi+1} \\ 0 & 0 & 0 & 1 \end{vmatrix}$$

It should also be noted that symbol Ai⁻ is an inverse matrix of Ai, and symbol Ovi (Ovxi, Ovyi, Ovzi) indicates an oriental vector, is equal to Nvi×Avi (outer product vector).

Next, a conversion formula from (Nvi+1, Ovi+1, Avi+1) to attitude data of an object to be controlled is described as the following formula (5), the attitude data are expressed by roll (rot (Z, RRvi+1)), pitch (rot (Y, PPvi+1)), and yaw (rot(X, YYvi+1)):

$$\begin{vmatrix} \vec{N}_{vi+1} & \vec{O}_{vi+1} & \vec{A}_{vi+1} & \vec{O} \\ 0 & 0 & 0 & 1 \end{vmatrix} = \begin{vmatrix} Crr & -Srr & 0 & 0 \\ Srr & Crr & 0 & 0 \\ 0 & 0 & 1 & 0 \\ 0 & 0 & 0 & 1 \end{vmatrix} \quad (5)$$

$$\begin{vmatrix} Cpp & 0 & Spp & 0 \\ 0 & 1 & 0 & 0 \\ -Spp & 0 & Cpp & 0 \\ 0 & 0 & 0 & 1 \end{vmatrix}$$

$$\begin{vmatrix} 1 & 0 & 0 & 0 \\ 0 & Cyy & -Syy & 0 \\ 0 & Syy & Cyy & 0 \\ 0 & 0 & 0 & 1 \end{vmatrix}$$

note=Crr=Crr=cos(RRvi+1), Srr=sin(RRvi+1)

Cpp=cos(PPvi+1), Spp=sin(PPvi+1)

Cyy=cos(YYvi+1), Syy=sin(YYvi+1)

Now, when rot (Z, RRvi+1)⁻ is multiplexed by both hands from the left direction, the below-mentioned formula (6) is obtained:

$$\begin{vmatrix} Crr & Srr & 0 & 0 \\ -Srr & Crr & 0 & 0 \\ 0 & 0 & 1 & 0 \\ 0 & 0 & 0 & 1 \end{vmatrix} \begin{vmatrix} N_{vxi+1} & O_{vxi+1} & A_{vxi+1} & 0 \\ N_{vyi+1} & O_{vyi+1} & A_{vyi+1} & 0 \\ N_{vzi+1} & O_{vzi+1} & A_{vzi+1} & 0 \\ 0 & 0 & 0 & 1 \end{vmatrix} = \quad (6)$$

$$\begin{vmatrix} Cpp & Spp \times Syy & Spp \times Cyy & 0 \\ 0 & Cyy & -Syy & 0 \\ -Spp & Cpp \times Syy & Cpp \times Cyy & 0 \\ 0 & 0 & 0 & 1 \end{vmatrix}$$

Based upon the above-explained formula, RRvi+1, PPvi+1, and YYvi+1 can be calculated:

−Srr*(Nvxi+1)+Crr*(Nvyi+1)=0 ∴ Rrvi+1=tan⁻[(Nvyi+1)/(Nvxi+1)]−Spp=Nvzi+1

Cpp=Crr*(Nvxi+1)+Srr*(Nvyi+1) ∴ PPvi+1=tan⁻[−(Nvzi+1)/((Crr*(Nvxi+1)+Srr*(Nvyi+1))]−Syy=−Srr*(Avxi+1)+Crr*(Avyi+1)

Cyy=−Srr*(Ovxi+1)+Crr*(Ovyi+1) ∴ Yyvi+1=tan−[(−Srr*(Avxi+1)+Crr*(Avyi+1))/(Srr*(Ovxi+1)−Crr*(Ovyi+1))]

The position/attitude data which should be operated on the motion base can be calculated based on the position/attitude data of the dynamic object (to be controlled) as previously explained. This can be executed only in such a case that the operation stroke is equivalent to the dynamic object (to be controlled) within the VR space. In this case, in order to realize operation occurred on the motion base having the finite stroke as indicated in FIG. 5 without having any sense of incongruity, converted into motion data by using a motion model having the following converting method, so as to operate mechanism in FIG. 11 concerned with each axis instruction data after converted, converted into a value of ball screw described by analysis chart as in FIGS. 12A, 12B, 12C, and actual operation is realized by servo instruction of time control 37 as shown in FIG. 3. As a basic idea of a motion model, a velocity feeling can be achieved only by using a visual feeling (picture), or a hearing feeling (sound), and a contact feeling (wind) on the motion base having the finite stroke mechanism. As a consequence, such a model capable of increasing concentration feelings of the rider on the motion base is designed by utilizing both the acceleration effect and the gravity effect.

Referring now to the analysis diagram shown in FIG. 12A, FIG. 12B, FIG. 12C, the inverse conversion formula will be explained. First, the conversion into the coordinate system of P1 (P1 being viewed from seat coordinate) is given as follows, as represented in FIG. 12A, considering now projections of X-Y plane and Y-Z plane (note that there is no adverse influence by Pitch):

$$X'=X+Ls*\cos p$$

$$Z'=Z-Ls*\sin p$$

r'=r (rotation centers of Roll and Pitch of a mechanism are "P1" due to arrangement of M2, M3) p'=p (rotation centers of Roll and Pitch of a mechanism are "P1" due to arrangement of M2, M3)

Next, when L2 and L3 are analyzed, the inverse conversion formula can be obtained as indicated in FIG. 12B.

Furthermore, when the projection of the X-Z plane is carried out, the inverse conversion formula can be obtained as shown in FIG. 12C. As a result, L1, L2, L3, and L4 can be calculated as follows:

$$L2=SQR[(Lb(1-\cos r)/\sin \alpha)^2+(Z-Ls*\sin p+Lb*\sin r)^2]$$

$$L3=SQR[(Lb(1-\cos r)/\sin \alpha)^2+(Z-Ls*\sin p-Lb*\sin r)^2]$$

$$L1=SQR[((Lb(1-\cos r)/\sin \alpha)\cos \alpha-La(1-\cos p)^2+(Z-Ls*\sin p+La*\sin p)^2]$$

$$L4=Lc-[X+Ls*\cos p+(Lb(1-\cos r)/\sin \alpha)\cos \alpha]$$

Next, a description will now be made of conversion models into Surge operation, Heave operation, and Sway operation; a mechanism correction model (Sway correction, Surge correction); and a filtering correction model.

(1) Conversion Model into Surge Operation

The surge operation corresponds to forward/backward operation of a motion base. Since this motion may give acceleration feelings of a motion base rider along the forward/backward direction, an acceleration velocity of an object to be controlled is calculated from the below-mentioned formula (7). Then in order to realize a finite stroke, a scaling of formula (8) is carried out, so that both an operation stroke and a velocity can be calculated;

$$Axi=d^2(|(Pxi+1)-Pxi|)/dt^2 \qquad (7)$$

$$\Delta Sxi=\Delta Sxi=(Lx/2)*(Axi/Axmax) \qquad (8).$$

Note that when Axi>Axmax, it is set: Axi=Axmax.

$$Vxi=d(|(Pxi+1)-Pxi|)/dt$$

Axi Surge axis acceleration velocity (time instant "i") of object to be controlled on VR,
ΔSxi: Surge axis operation amount (time instant "i"),
Vxi: Surge axis transport velocity (time instant "i"),
Lx: Surge axis maximum operation stroke,
Axmax: Surge axis allowable maximum acceleration velocity,
Pxi: positional data (X component, time instant "ii") of object to be controlled.

(2) Conversion Model to Heave Operation

The Heave operation corresponds to upper/lower operations of a motion base. Since this motion may give acceleration feelings of a motion base rider along the upper/lower direction, an acceleration velocity of an object to be controlled is calculated from the below-mentioned formula (9). Then, in order to realize a finite stroke a scaling of formula (10) is carried out, so that both an operation stroke and a velocity can be calculated:

$$Ayi=d^2(|(Pyi+1)-Pyi|)/dt^2 \qquad (9)$$

$$\Delta Syi=(Ly/2)*(Ayi/Aymax) \qquad (10)$$

Note that when Ayi>Aymax, it is set: Ayi=Aymax.

$$Vyi=d(|(Pyi+1)-Pyi|)/dt$$

Ayi: Heave axis acceleration velocity (time instant "i") of object to be controlled on VR,
ΔSyi: Heave axis operation amount (time instant "i"),
Vyi: Heave axis transport velocity (time instant "i"),
Ly: Heave axis maximum operation stroke,
Aymax: Heave axis allowable maximum acceleration velocity,
Pyi: positional data (Y component, time instant "i") of object to be controlled.

(3) Conversion Model into Sway Operation

The Sway operation corresponds to right/left operation of a motion base. Since this motion may give acceleration feelings of a motion base rider along the right/left direction, an acceleration velocity of an object to be controlled is calculated from the below-mentioned formula (11). Then in order to realize a finite stroke, a scaling of formula (12) is carried out, so that both an operation stroke and a velocity can be calculated;

$$Azi=d^2(|(Pzi+1)-Pzi|)/dt^2 \qquad (11)$$

$$\Delta Szi=(Lz/2)*(Azi/Azmax) \qquad (12).$$

Note that when Azi>Azmax, it is set: Azi=Azmax.

$$Vzi=d(|(Pzi+1)-Pzi|)/dt$$

Azi: Sway axis acceleration velocity (time instant "i") of object to be controlled on VR,
Szi: Sway axis operation amount (time instant "i"),
Vzi: Sway axis transport velocity (time instant "i"),
Lz: Sway axis maximum operation stroke,
Azmax: Sway axis allowable maximum acceleration velocity,
Pzi: positional data (Z component, time instant "i") of object to be controlled.

(4) Mechanism Correction Mode 1 (Sway correction)

There are some cases that the above-described conversion model could not be applied, depending upon mechanical mechanism. There is shown an example of a mechanical correction model used in this case. First, in such a case that the mechanism has no Sway axis operation mechanism, the Sway amount ΔYo is corrected to a rotation amount Ro of a Roll axis.

Assuming now that a position of a coordinate system is "P" and a length of the Roll axis defined from a rotation center up to P is "Lo", $$Yo=Lo*Ro.$$

As a consequence, a roll correction amount ΔRo is calculated from formula (13), and then is added to the rotation amount Ro of the Roll axis.

$$\Delta Ro = \Delta Yo/Lo \qquad (13)$$

After all, the acceleration feelings along the right/left direction may be realized by increasing the rotation amount "Ro" of the Roll axis by ΔRo. It should be noted that when the length Lo is increased, the roll correction amount ΔRo can be decreased.

(5) Mechanism Correction Mode 2 (surge correction)

There are some cases that the above-described conversion model could not be applied, depending upon 10 mechanical mechanism, which is shown an example of a mechanical correction model 2. In such a case that the mechanism has no Surge axis operation mechanism, the Surge amount ΔXo is corrected to a rotation amount Po of a Pitch axis.

Assuming now that a position of a coordinate system is "P" and a length of the Pitch axis defined from a rotation center up to P is "Lo", $$Xo = Lo * Po.$$

As a consequence, a pitch correction amount ΔPo is calculated from formula (14), and then is added to the rotation amount Po of the Pitch axis.

$$\Delta Po = \Delta Xo/Lo \qquad (14)$$

After all, the acceleration feelings along the forward/backward direction may be realized by increasing the rotation amount "Po" of the Pitch axis by ΔPo. It should be noted that when the length Lo is increased, the pitch correction amount ΔPo can be decreased.

(6) Filtering Correction Model

There are some cases that operations are excessively effected when data from a picture is converted in accordance with the above-explained model. In such a case, a low-pass filter model capable of smoothing the operation is prepared.

An example of the low-pass filter model employed in the present model is described as follows: It should be noted that symbol "S" denotes a delay.

$$1 + TL*S/(1 + \alpha * TL*S) \qquad (15)$$

$$F(S) = \{(1 + TL*S)/(1 + \alpha L*TL*S)\} * \{(1 + Tf*S)/(1 + \alpha f*Tf*S)\} \qquad (16)$$

Note that symbol " L" is a lead system when the following condition is given:

$$<1.0.$$

When this low-pass filter model is employed, a high frequency component can be cut, and thus, the portion where the operations are excessively performed can be out, so that the operations can be smoothed.

In FIG. 13, there is shown an example of a block diagram for executing the above-described model. This model is arranged by World Coordinates 131, Image Coordinates 132, Transformation into World coordinates 133, Transformation into Motion-Base coordinate 134, Transformation of acceleration 135, Scaling Revision 136, Filter Control 137, Transformation Servo Data 138, and Servo Control 139.

Then, the Image Coordinates 132 first become the Transformation into World coordinates 133, and then, become the Transformation into Motion-Base coordinates 134 together with World Coordinates 131, and the Transformation of acceleration 135 is carried out and then becomes the Scaling revision 136, furthermore becomes the Filter Control 137, becomes the Transformation Servo Data 138, and becomes the Servo Control 139.

Referring now to FIG. 14 to FIG. 20, a description will be made of another embodiment of the present invention.

A simulation rider transporting apparatus whose entire portion is indicated by reference numeral 1 is equipped with a rider base 144 corresponding to a first base for mounting a seat 142. The seat 142 constrains a rider "H" by way of a seat belt and the like.

The rider base 144 is supported via an elevation actuator 1410 by a base 146 which constitutes a second base.

The base 146 is supported via a wheel and the like with respect to a rail (not shown), and the transport of this base 146 is controlled along a direction indicated by an arrow.

The base 146 supports the rider base 144 via an actuator 1410 corresponding to 3 sets of elevating means.

Figure 15:
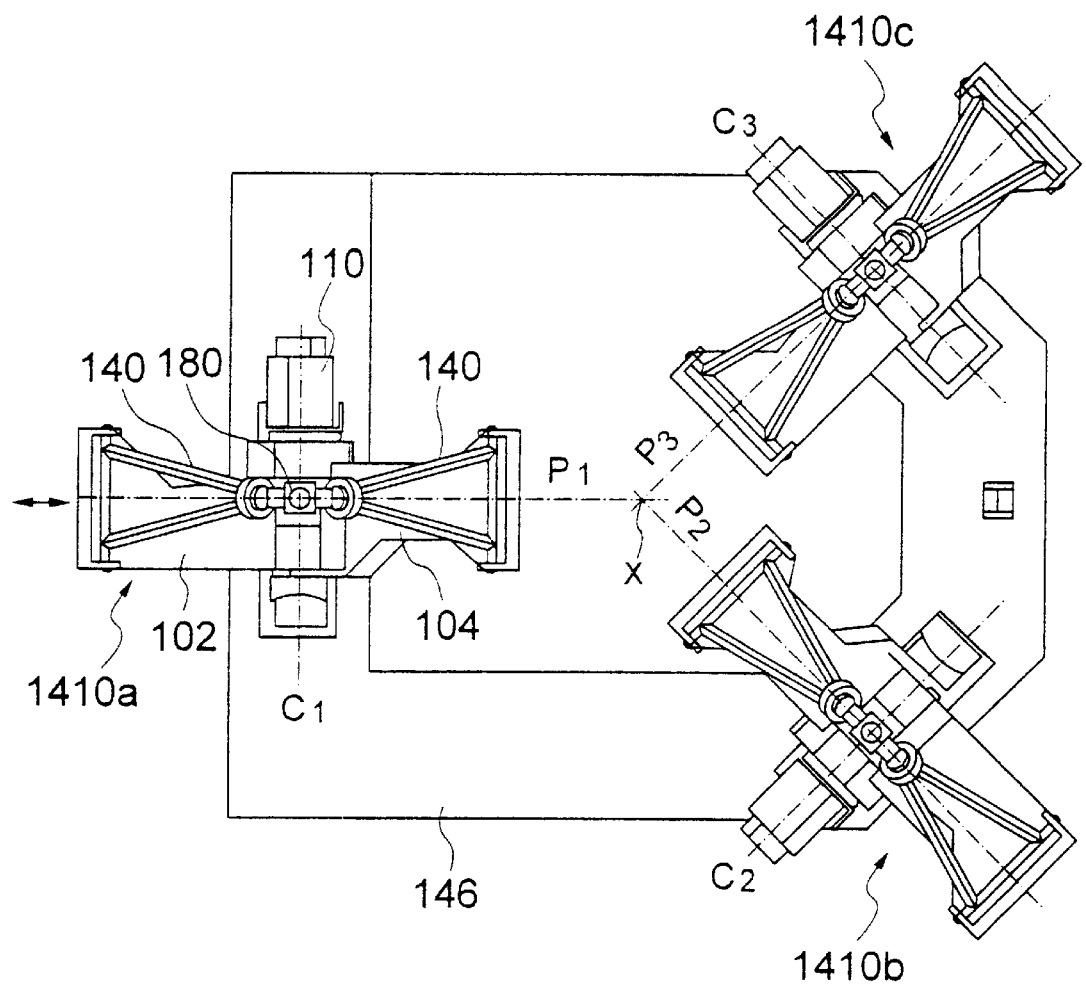
FIG. 15 is a plan view for representing an arrangement of an elevation means of the simulation rider transporting means indicated in FIG. 14.
Figure 16:
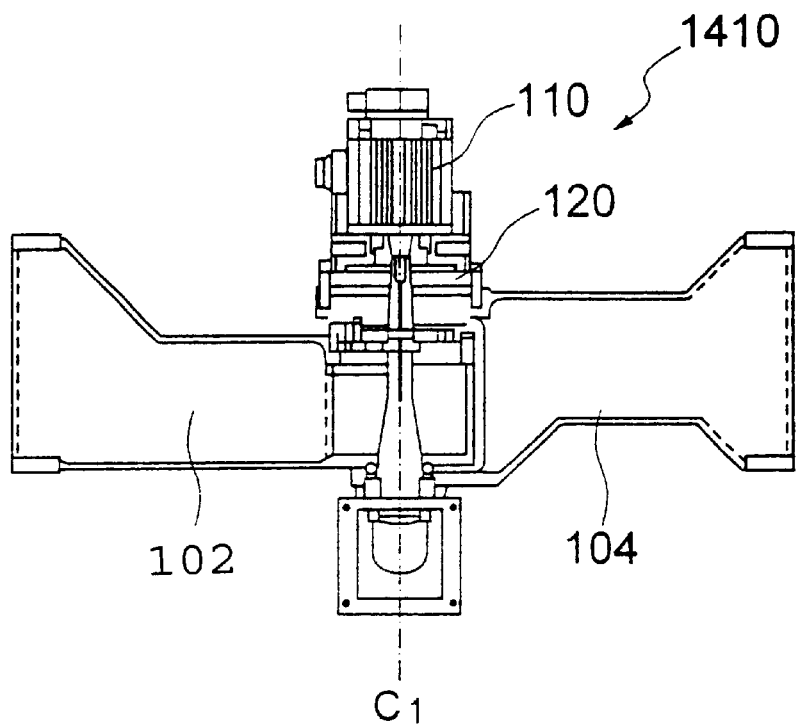
FIG. 16 is plan view for representing a construction of an elevation actuator of the simulation rider transporting apparatus shown in FIG. 14.
Figure 17:
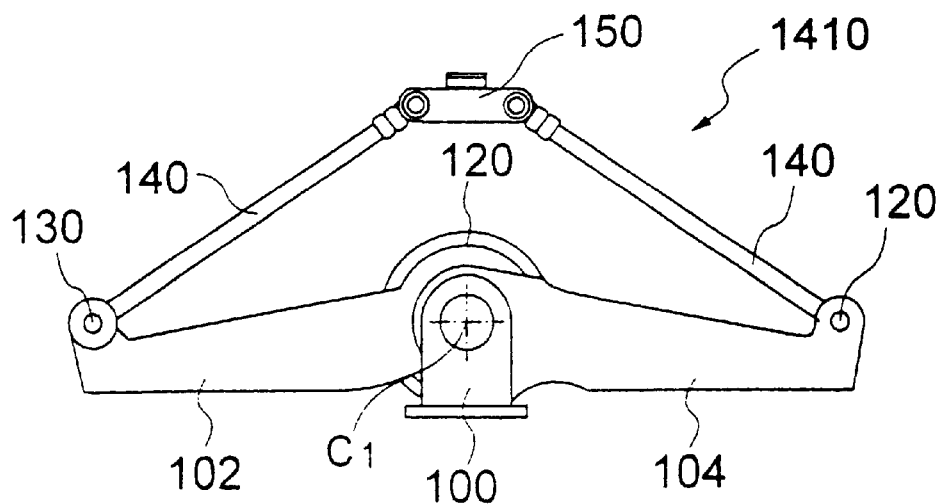
FIG. 17 is a front view for indicating the elevation actuator shown in FIG. 16.
Figure 18:
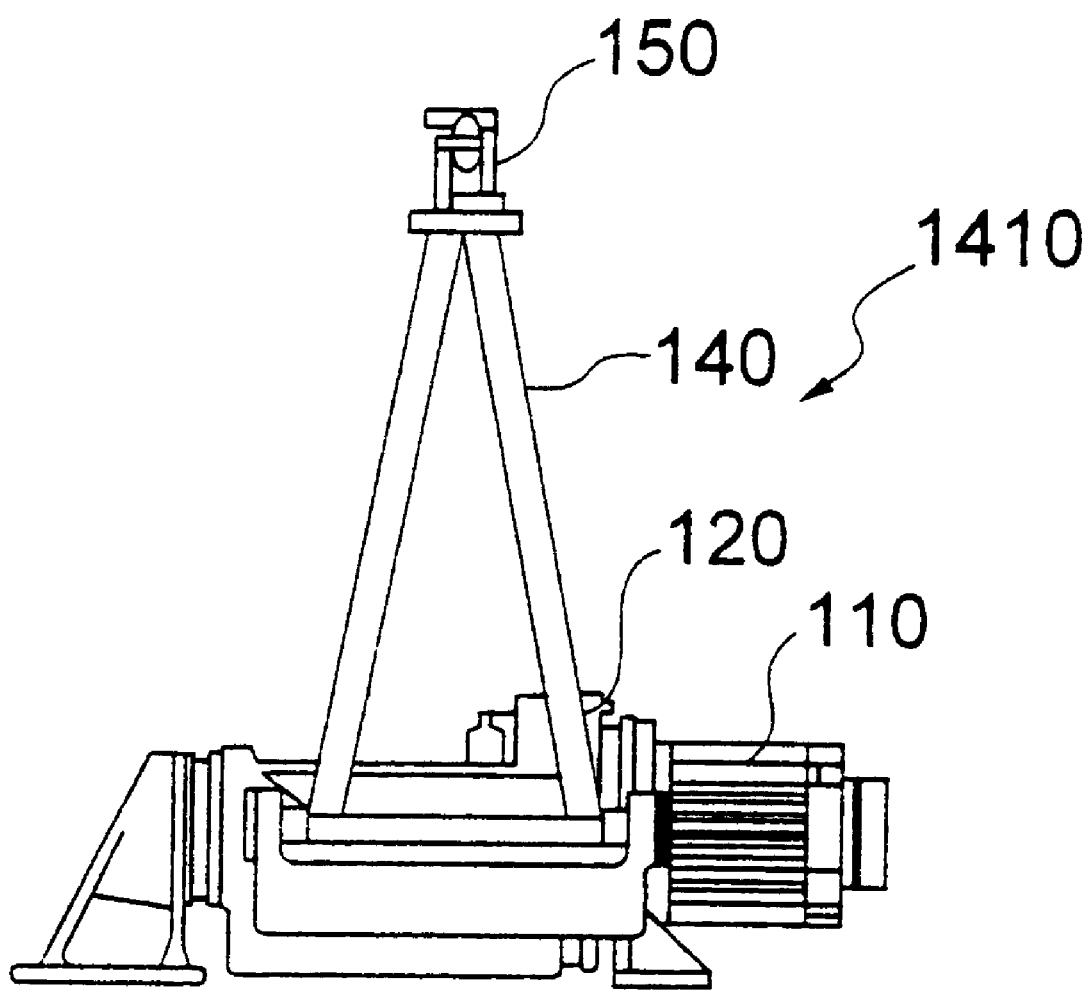
FIG. 18 is a side view for indicating the construction of the elevation actuator shown in FIG. 16.

FIG. 15 represents attitudes of 3 sets of elevation actuators 1410 arranged on the base 146. A first elevation actuator 1410a is arranged at a forward position of a front seat, whereas a second elevation actuator 1410b and a third elevation actuator 1410c are arranged on both sides of a rear portion of the base 146.

As represented in FIG. 16 to FIG. 19, the elevation actuator 1410 is equipped with two cranks positioned opposite to each other, and is supported by a bracket 100 fixed on the base 146.

The bracket 100 supports a motor 110, and two crank arms 102 and 104 in a swingable manner. These two crank arms 102 and 104 are driven via a reduction apparatus 120.

In other words, a power shaft of the motor 110 is coupled to the first crank arm 102, and the housing side of the motor 110 is coupled to the second crank arm 104. A relative angle " " defined by the first crank arm 102 and the second crank arm 104 can be controlled by controlling the motor. In this case, the entire portion of the two crank arms 102 and 104 containing the motor 110 is supported in a swingable manner around an axis "$C_1$" with respect to the bracket 100.

One end portion of a crank rod 140 is rotatably coupled to each of tip portions of the two crank arms 102 and 104, and the other end portion of this crank rod 140 is coupled to a trunnion-shaped elevation member 150.

The elevation member 150 is coupled via a bracket 180 to the rider base 144.

In FIG. 15, the first elevation actuator 1410a is supported around the first axis $C_1$ in a swingable manner. As a consequence, the crank arms 102, 104, the crank rod 140, and the elevation bracket 180 are moved within a first plane $P_1$ which is located perpendicular to the first axis $C_1$.

The second elevation actuator 1410b is arranged in such a manner that an axis "$C_2$" thereof intersects the swing shaft of the first elevation actuator 1410a.

The third elevation actuator 1410c is arranged in such a manner that an axis "$C_3$" thereof intersects the swing shaft $C_1$ of the first elevation actuator 1410a. These 3 elevation actuators are arranged on the plane in such a manner that three planes $P_1$, $P_2$, $P_3$ where the crank arm, the crank rod, and the elevation bracket are moved may intersect a single point " ".

Figure 19:
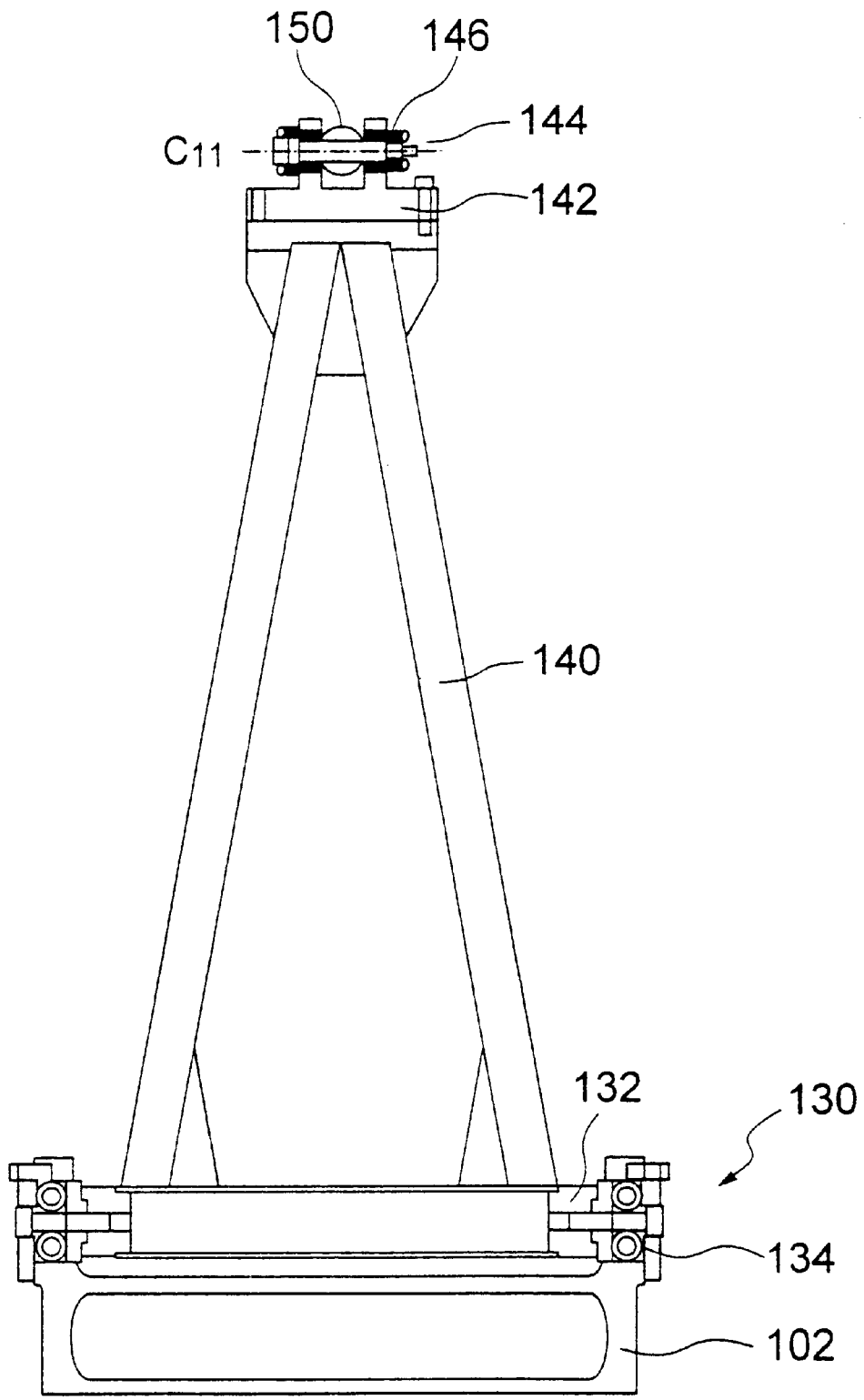
FIG. 19 is an explanatory diagram for showing a coupling means between the elevation actuator and the mounting base.
Figure 20:
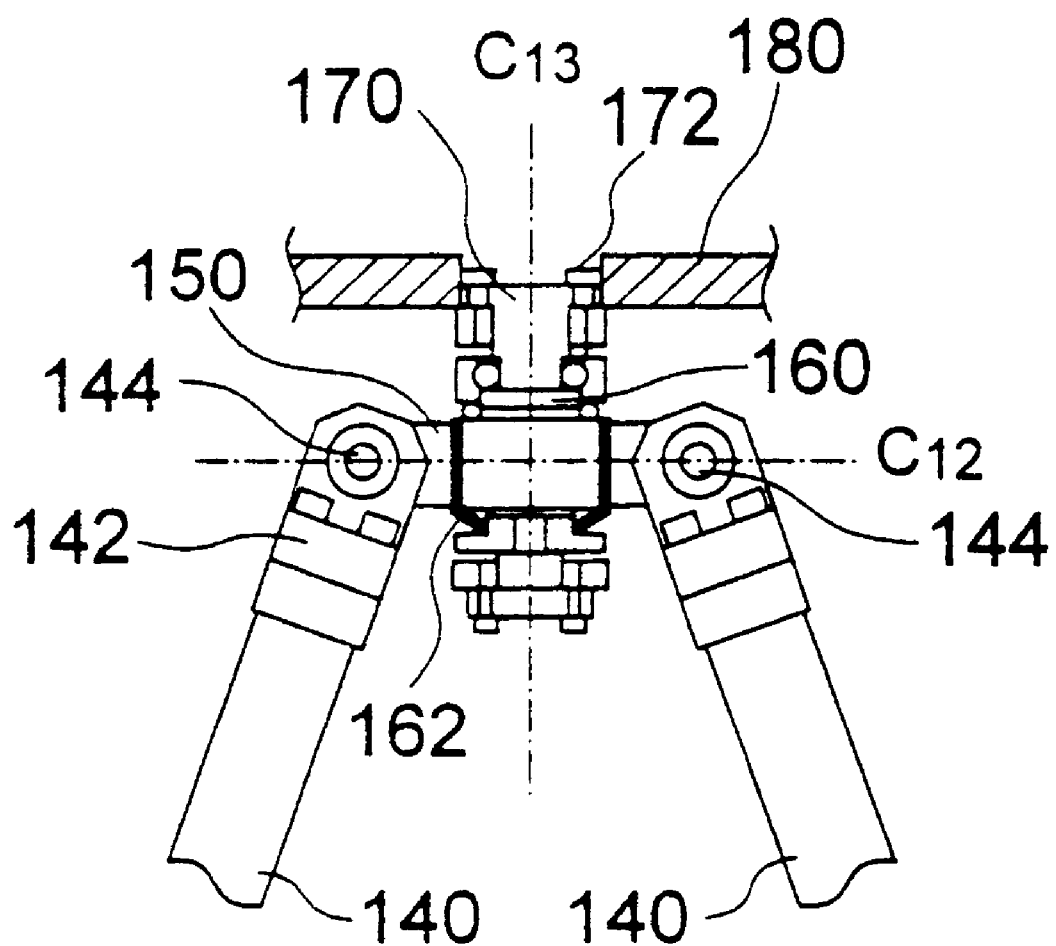
FIG. 20 is an explanatory diagram for explaining in detail the coupling means between the elevation actuator and the mounting base.

FIG. 19 and FIG. 20 are explanatory diagrams for showing supporting structures of the elevation bracket 180.

A node 130 provided at a tip portion of the crank arm 102 owns a shaft 132 pivotally supported by a bearing 134. The shaft 132 pivotally supports a lower end portions of the crank rod 140.

A bracket 142 is fixed on the upper edge portion of the crank rod 140. The bracket 142 supports both end portions of the trunnion rod 150 by the shaft 144 which is rotatably supported by the bearing 140 around an axis $C_{11}$. A housing 160 is rotatably supported via a bearing 162 around an axis $C_{12}$ at a center portion of the trunnion rod 150. This housing 160 supports a shaft 170 via a bearing 172 around an axis $C_{13}$, and an elevation bracket 180 is fixed with respect to the shaft 170.

The elevation bracket 180 supports the rider base 44. As a consequence, the elevation bracket 180 is supported with having a free degree along the three-dimensional direction with respect to the crank rod.

Since this apparatus is equipped with the above-described structures, the elevation amounts and also the elevation speeds of 3 sets of elevation actuators 1410a, 1410b, and 1410c are varied. As a result, the rider base 144 can achieve the pitch motion, the roll motion, and upper/lower motion. In addition to this motion, the base 146 is moved along the forward/backward direction, so that 4 sorts of motion can be achieved. Since these four sorts of motion are combined with each other, the rider H can have simulation experiences.

When the rider base 144 is elevated along the upper/lower directions, one arm of the two crank arms 102 and 104 receives force derived from the rotation shaft of the motor 110, and the other arm thereof receives force derived from the main body portion of the motor 110. As a result, only one set of the motor may be sufficiently used, since torque of the motor 110 does not give effects to any members other than these two crank arms 102 and 104.

It should be noted that one set of the motor is used in the above-explained embodiment as the nonconstraining means for changing the angle defined between the two cranks to hold the changed angle. Alternatively, an oil pressure apparatus may be used. Also, the elevation means are arranged along the right-hand, left-hand, and forward directions with respect to the rider base. Alternatively, these elevation means may be used at more than 3 positions. Furthermore, the forward/backward transporting means may not be employed. In this alternative case, the base may constitute the second base.

Since the simulation rider transporting apparatus according to this embodiment is equipped with the above-described structures and need not uses a cylinder type rod, the height of the simulation rider transporting apparatus can be largely suppressed, and further, the large operation stroke can be realized. Then, when the simulation rider transporting apparatus is installed in facilities, this simulation rider transporting apparatus can be readily installed at the existing place without newly digging a pit, and also without newly constructing a building.

The above-described embodiment is related to the simulation rider transporting apparatus equipped with the seat 142, the rider H, the base 146, and the elevation member 150, and the elevation actuator 1410. Alternatively, while the base 146 is used as a forward/backward transport base, both the forward/backward transport actuator and the base may be provided under this forward/backward base. In this alternative case, although the height of the simulation rider transporting apparatus becomes high, the forward/backward transport base may be transported along the forward/backward direction by way of the forward/backward actuator, and the rider base 144 can be quickly transported along the forward/backward direction. While the elevation actuator is bent along the horizontal direction, is coupled to the base, and also the rod is rotatably coupled to the forward/backward base, the forward/backward transport base can be transported along the forward/backward direction.

While the embodiment according to the present invention have been described above, the motion base control apparatus as indicated in FIG. 1 through FIG. 7 corresponds to such a correction means capable of executing the very fine correcting operation for executing the temporal correction every frame in the correction by the temporal aspect, and such a correction means which becomes effective in the frame correction when the synchronization is largely shifted, or deviated.

Also, in accordance with the embodiment indicated from FIG. 8 to FIG. 13, since the motion base operation data can be produced from the CG data, even in such an interactive system that the operation pattern cannot be previously predicted, the motion base operation data can be produced, and the application range of the motion base can be widened.

Furthermore, in accordance with the embodiment shown in FIG. 14 to FIG. 20, it is possible to obtain the simulation rider transporting apparatus, the height of which can be suppressed to a low height.

What is claimed is:

1. A virtual reality motion base control apparatus comprising:

a picture apparatus for projecting a picture on a screen; and control means for sequentially executing motion base operation data constructed of picture data and for controlling motion of a motion base operated in connection with the projected picture, said control means for controlling the motion of the motion base including correction means for operating the motion base synchronously with the picture data of the picture apparatus; and wherein said correction means for operating the motion base includes:

means for receiving a picture frame number of a picture presently projected from the picture apparatus;

means for detecting a motion frame number of operation data of a presently executed motion of the base;

means for comparing the picture frame number with the motion frame number to calculate a difference in value thereof;

means for calculating an operation velocity of the motion base based on the difference in value; and means for moving the motion base at the calculated velocity to reduce the difference in value between the picture frame number and the motion frame number, so as to synchronize operation of the motion base with the picture data of the picture apparatus.

* * * * *